US009222163B2

(12) United States Patent
Box et al.

(10) Patent No.: US 9,222,163 B2
(45) Date of Patent: Dec. 29, 2015

(54) LAYERED COATING SYSTEM WITH A MCRALX LAYER AND A CHROMIUM RICH LAYER AND A METHOD TO PRODUCE IT

(75) Inventors: Paul Box, Washingborough (GB); Hugh Evans, Ashleworth (GB); Thomas Kircher, Biddeford (GB); Thomas Lewis, Chester Springs, PA (US); Bruce McMordie, Perkasie, PA (US); John Nicholls, Milton Keynes (GB); Paul Padley, Tattershall (GB); Nigel Simms, Milton Keynes (GB); Jonathan Venezia, Pottstown, PA (US); Paul Mathew Walker, Dunholme (GB); Adrian Weatherill, Grantham (GB); Mick Whitehurst, Heighinton (GB)

(73) Assignees: SIEMENS AKTIENGESELLSCHAFT, München (DE); PRAXAIR S.T. TECHNOLOGIES INC., Danbury, CT (US)

( * ) Notice: Subject to any disclaimer, the term of this patent is extended or adjusted under 35 U.S.C. 154(b) by 534 days.

(21) Appl. No.: 13/322,186

(22) PCT Filed: May 26, 2009

(86) PCT No.: PCT/US2009/003204

§ 371 (c)(1), (2), (4) Date: May 10, 2012

(87) PCT Pub. No.: WO2010/138096

PCT Pub. Date: Dec. 2, 2010

(65) Prior Publication Data

US 2013/0040166 A1 Feb. 14, 2013

(51) Int. Cl.

*B32B 15/00* (2006.01)
*C23C 4/18* (2006.01)
*C23C 10/02* (2006.01)

(Continued)

(52) U.S. Cl.

CPC . *C23C 4/18* (2013.01); *C23C 10/02* (2013.01); *C23C 28/021* (2013.01); *C23C 28/022* (2013.01); *C23C 28/023* (2013.01); *C23C 28/321* (2013.01); *C23C 28/322* (2013.01); *C23C 28/3215* (2013.01); *C23C 28/345* (2013.01); *C23C 28/3455* (2013.01); *Y02T 50/67* (2013.01); *Y10T 428/12944* (2015.01)

(58) Field of Classification Search

None

See application file for complete search history.

(56) References Cited

U.S. PATENT DOCUMENTS 5,499,905 A * 3/1996 Schmitz et al. ........... 416/241 R
5,500,252 A 3/1996 Meelu
5,507,623 A 4/1996 Arikawa (Continued)

FOREIGN PATENT DOCUMENTS

CA 1102184 A1 6/1981
CN 1890456 A 1/2007

(Continued)

*Primary Examiner* — Humera Sheikh
*Assistant Examiner* — Daniel J Schleis

(57) ABSTRACT

A layer system and a method for producing a component having such a layer system are provided. The layer system includes a substrate a substrate, at least one MCrX layer on the substrate, and a chromium-rich layer on or in the at least one MCrX layer. X includes at least one element selected from the group consisting of yttrium (Y), silicon (Si), aluminum (Al) and boron (B). M includes at least one element selected from the group consisting of nickel (Ni) and cobalt (Co).

11 Claims, 5 Drawing Sheets

22
10
16
7'
4
1

(51) Int. Cl.
*C23C 28/02* (2006.01)
*C23C 28/00* (2006.01)

(56) References Cited

U.S. PATENT DOCUMENTS

| | | | | |
|---|---|---|---|---|
| 6,001,492 | A | 12/1999 | Gigliotti, Jr. | |
| 6,024,792 | A | 2/2000 | Bieler | |
| 6,183,888 | B1 | 2/2001 | Alperine et al. | |
| 6,287,644 | B1 | 9/2001 | Gigliotti, Jr. | |
| 6,416,882 | B1 | 7/2002 | Beele | |
| 6,569,492 | B2 | 5/2003 | Fernihough et al. | |
| 7,060,366 | B2 | 6/2006 | Das | |
| 7,229,701 | B2 | 6/2007 | Duffy | |
| 7,264,887 | B2 * | 9/2007 | Khan et al. | 428/632 |
| 2001/0053410 | A1 | 12/2001 | Dorn | |
| 2005/0003227 | A1 | 1/2005 | Khan | |
| 2010/0266409 | A1 * | 10/2010 | Chandra et al. | 416/95 |

FOREIGN PATENT DOCUMENTS

| | | | |
|---|---|---|---|
| CN | 101125753 | A | 2/2008 |
| CN | 101331246 | A | 12/2008 |
| DE | 102005060243 | A1 | 6/2007 |
| EP | 0412397 | B1 | 2/1991 |
| EP | 0486489 81 | | 11/1994 |
| EP | 0486489 | B1 | 11/1994 |
| EP | 0587341 | B1 | 3/1996 |
| EP | 0786017 | B1 | 7/1997 |
| EP | 0821076 | A1 | 1/1998 |
| EP | 0412397 | B1 | 3/1998 |
| EP | 0786017 | B1 | 3/1999 |
| EP | 1029100 81 | | 8/2000 |
| EP | 1029100 | A1 | 8/2000 |
| EP | 1082216 | B1 | 3/2001 |
| EP | 1029100 | B1 | 9/2001 |
| EP | 1082216 | B1 | 11/2001 |
| EP | 1204776 | B1 | 5/2002 |
| EP | 1306454 | A1 | 5/2003 |
| EP | 1319729 | A1 | 6/2003 |
| EP | 1327702 | A1 | 7/2003 |
| EP | 1204776 | B1 | 6/2004 |
| EP | 1306454 | B1 | 10/2004 |
| EP | 1541808 | A1 | 6/2005 |
| EP | 1676938 | A1 | 7/2006 |
| EP | 1772529 | A1 | 4/2007 |
| EP | 1865150 | A1 | 12/2007 |
| EP | 0892090 | B1 | 4/2008 |
| GB | 0903199 D0 | | 8/1962 |
| GB | 2322382 | A | 8/1998 |
| JP | 6220607 | A | 8/1994 |
| RU | 2188250 | C2 | 8/2002 |
| RU | 2004104730 | A | 8/2005 |
| WO | WO 9967435 | A1 | 12/1999 |
| WO | WO 0044949 | A1 | 8/2000 |
| WO | WO2007101465 | * | 9/2007 |
| WO | WO 2007140805 | A1 | 12/2007 |
| WO | WO 2009036776 | A1 | 3/2009 |

* cited by examiner 100
105
104
135
102
103
107
110
113
106
143
108
138
115
112
125
111
109
133
130
120
140

121
415
418
409
412
418
120, 130
418
406
403
183
400

153
110, 106
155

LAYERED COATING SYSTEM WITH A MCRALX LAYER AND A CHROMIUM RICH LAYER AND A METHOD TO PRODUCE IT

CROSS REFERENCE TO RELATED APPLICATIONS

This application is the US National Stage of International Application No. PCT/US2009/003204, filed May 26, 2009 and claims the benefit thereof. The application is incorporated by reference herein in their entirety.

FIELD OF INVENTION

The invention relates to a layered system with a MCrAlX layer, a Cr-rich layer that is uniquely resistant to both oxidation and hot corrosion and a method to produce such a system. Preferably an aluminide layer is applied.

BACKGROUND OF INVENTION

EP0587341 describes a high temperature corrosion resistant composite coating where the process includes the following steps:

Applying an alloy coating material of the MCrAlY type.

Optionally chromizing the MCrAlY type coating to produce a coating with a chromized top layer having extra chromium in solid solution in the M constituent of the coating.

Aluminizing the coating to produce a coating having a surface layer containing aluminides of the M constituent of the coating.

Depositing a platinum layer on top of the surface of the aluminized coating.

EP 1327702 describes a MCrAlY coating system comprising an inner layer of beta-NiAl and an outer layer of gamma/beta-MCrAlY and TBC. In the document it is stated that the oxidation resistance can be improved for theses layers of coating by adding 0.1-4% Si. The coatings are deposited using a gas phase method, CVD, PVD etc.

US 2005/0003227 describes a similar system as in US '227, but here is also an intermediate layer of a platinum type of metal included. In the document it is stated that the oxidation resistance can be improved for these layers of coating by adding 0.1-4% Si.

EP 1029100/U.S. Pat. No. 6,416,882 describes a MCrAlY type of bond coat comprising up to 2% silicon.

Aluminide and/or chromium modified coating systems are also described in U.S. Pat. No. 7,229,701, U.S. Pat. No. 6,183,888, U.S. Pat. No. 7,060,366, U.S. Pat. No. 6,287,644, EP 1 082 216, U.S. Pat. No. 6,001,492, U.S. Pat. No. 5,507,623, EP 1 541 808 and U.S. Pat. No. 6,569,492.

EP 0587341 describes a high temperature corrosion resistant composite coating where the process includes the following steps:

Applying an alloy coating material of the MCrAlY type.

Optionally chromizing the MCrAlY type coating to produce a coating with a chromized top layer having extra chromium in solid solution in the M constituent of the coating.

Aluminizing the coating to produce a coating having a surface layer containing aluminides of the M constituent of the coating.

Depositing a platinum layer on top of the surface of the aluminized coating.

But these coatings are still not good enough.

SUMMARY OF INVENTION

It is therefore the aim of the invention to solve this problem.

The problem is solved by.

In the dependent claims further advantageous embodiments are listed which can be combined arbitrarily to get further advantages.

The concept behind the invention is based on different coating chemistries being suited to protect a substrate within certain temperature and environmental criteria. For example during high temperature oxidation an outer β-NiAl-layer provides the protection by forming a tenacious thin Alumina oxide in reaction with the high temperature and oxygen in the system, this reaction is typical of the similar β-NiAl coatings found in industry and well documented in literature. At temperatures of around 750° C. to 800° C. up to around 950° C. a broad front attack can occur depleting unprotected substrate materials of Cr and Al. Again the use of an Alumina forming β-NiAl coating will protect against type I corrosion. However, for type II corrosion, localized pitting type corrosion is more likely. Molten salts in the gas stream combined with $SO_2$ and $SO_3$ condense onto the turbine components resulting in small pits in the surface. The best defense for such attack is the introduction of a Cr rich coating system. The important aspect of the invention is that the Cr rich layer is continuous and is as thermally stable as possible, therefore if the components are operating in a type II corrosion environment the β-NiAl is consumed, however, the corrosion damage is restricted to the outer layer of β-NiAl and the continuous α-Cr layer provides suitable protection, additions of elements which add to the coatings corrosion protection such as, but not limited to Si or Hf. A strain complaint base layer is added in the form of an MCrAlY coating, which provides a degree of strain compliance as well as a final layer of protection should the β-NiAl and α-Cr be compromised. By design then, the layered coating structure essentially allows the environment to "select" the coating composition most suitable to provide protection. The concept can be clearly demonstrated in FIG. 3. The introduction of Si or other beneficial elements can increase the expected life of the α-Cr layer.

BRIEF DESCRIPTION OF THE DRAWINGS

It shows

DETAILED DESCRIPTION OF INVENTION

The figures and the description are only embodiments of the invention.

Figure 1:
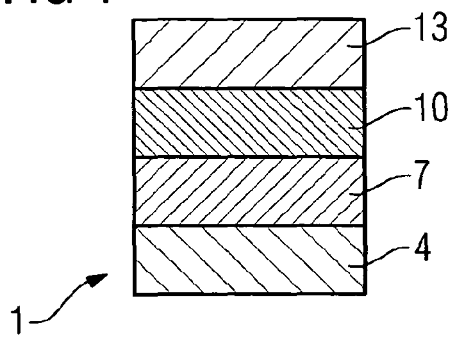
FIGS. 1 to 5 examples of a layer system

FIG. 1 shows one exemplary component 1 as a layer system of the invention.

The component 1 has a metallic substrate 4 which preferably comprises a heat resistant cast or wrought nickel or cobalt alloy, which is preferably Hastelloy X.

Figure 4:
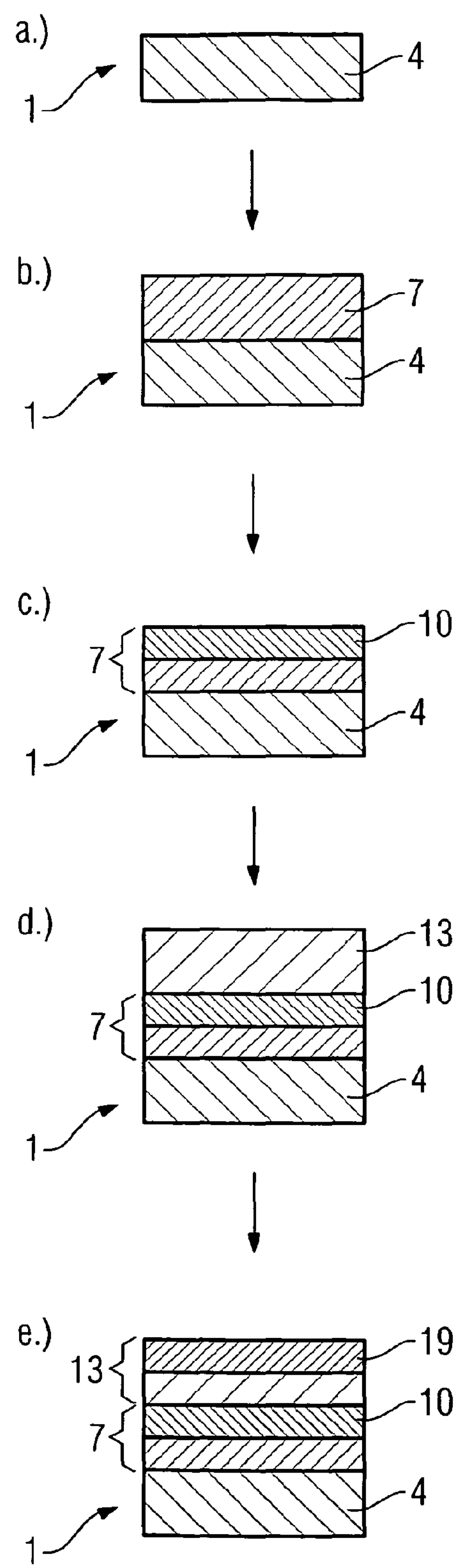

Preferably on the substrate 4 in (a.) in FIG. 4) an inner or lowest MCrX layer 7 is applied, especially only one MCrX layer 7 is applied in (b.) in FIG. 4) where X is yttrium (Y) and/or silicon (Si) and/or boron (B) and/or aluminum (Al).

The inner MCrX layer 7 comprises MCrAlX' with X' at least Yttrium (Y) and is preferably only Yttrium (Y).

This inner MCrAlX' layer 7 comprises especially a NiCrAlY layer and very especially comprises in at % Ni, 22% Cr, 10% Al, 1.0% Y, especially consists of Amdry 962.

The inner MCrX layer 7 is preferably applied by HVOF.

The inner MCrX layer 7 is also preferably direct on the substrate 4.

On or in this inner MCrX layer 7 a chromium rich layer 10 is applied on (c.) in FIG. 4)), especially an α-Cr-layer.

The chromizing is preferably performed from 1000° C. to 1150° C. preferably from 1 to 6 hours, very preferably at 1050° C.-1075° C. for 2 h to 4 h.

The chromizing treatment will lead at least partly to a diffusion layer on the inner layer 7 (Therefore the reference 7 in FIG. 4 *c*) represents the thickness of the inner layer 7 or that a diffusion layer is present and not one composition). The chromium rich layer 10 is preferably a diffusion layer.

This layer system 1 is preferably heat treated, so that the overlay Cr layer is diffused into the inner MCrAlX' layer 7.

Preferably on this α-chromium layer 10 an additional further nickel based layer, a first outer MCrX" layer 13 is applied on which is preferably the outer most layer (d.) in FIG. 4).

This MCrX" layer X" is preferably silicon (Si) and boron (B).

Furthermore, the first outer MCrX" layer 13 can be a silicon and/or boron-containing nickel chromium alloy Ni—Cr—Si—B.

This first outer MCrX" layer 13 has a different composition than the inner layer 7 and is very especially a NiCrSiB layer (Amdry 103 which consists of in at % 74% Ni, 17% Cr, 9.2% Y, 9% Si, 0.1% B).

After applying the MCrX" (NiCrSiB) layer, preferably performed by HVOF, a stabilizing heat treatment is preferably performed. This stabilizing heat treatment is performed at temperatures preferably 1000° C. to 1200° C. preferably for 1 to 6 hours, preferably at 1000 to 1025° C. for 6 h.

Figure 3:
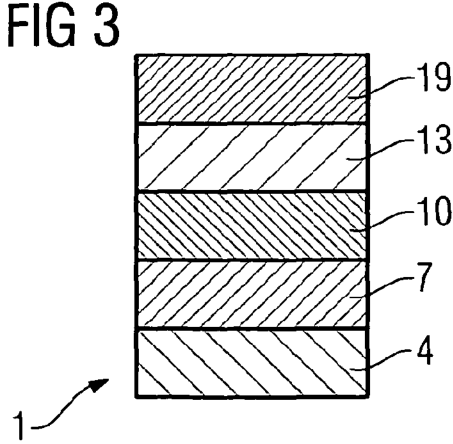

Preferably a second outer layer 19 is present on or in the first outer layer 13. The second outer layer 19 is an aluminum rich layer as shown in FIG. 3.

Preferably the outer layer 19 is a diffusion layer.

The first outer MCrX" layer 13 can be aluminized to achieve the second outer layer 19 (e.) in FIG. 4).

The aluminizing treatment is performed at temperatures preferably from 1050° C. to 1115° C. preferably for 1 to 10 hours, preferably at 1070° C. to 1095° C. for 7 h. Preferably there is a final anneal treatment preferably at 1000° C. to 1150° C. for 1 to 6 hours, preferably at 1080° C. for 2 h, very preferably in vacuum.

Figure 2:
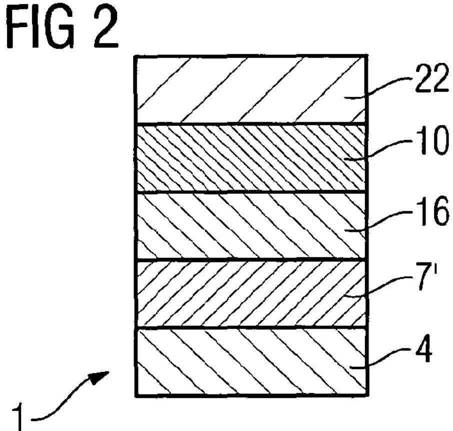

In FIG. 2 a further embodiment of the invention is shown. The component 1 has a metallic substrate 4 which preferably comprises a heat resistant cast or wrought nickel or cobalt alloy.

In FIG. 2 this substrate is preferably "Hastelloy X™" a commercially available wrought nickel alloy that nominally contains 47% Ni, 22 Cr, 18.5 Fe, 9 Mo, 1.5 Co, 1 Si, 1 Mn, 0.1 C.

Figure 5:
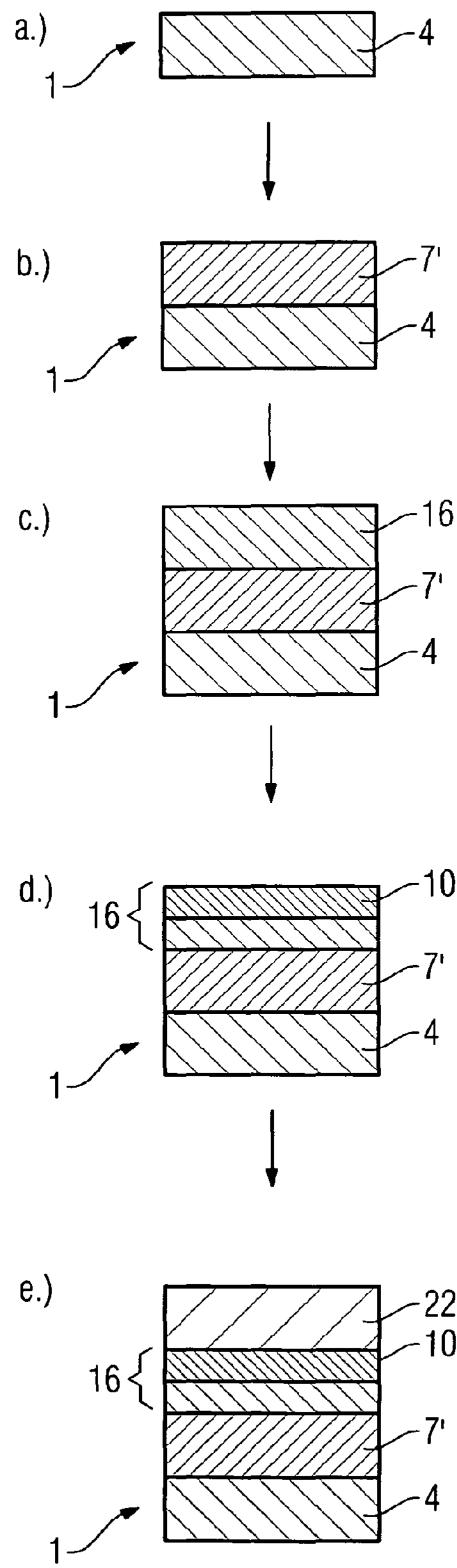

Preferably on the substrate 4 (a.) in FIG. 5) first inner MCrX layer 7 is applied (b.) in FIG. 5), especially only two MCrX' layer 7', 16 are applied, where X' is at least yttrium (Y) and is preferably only Yttrium (Y).

This first inner MCrAlX' layer 7' comprises especially a NiCrAlY layer and very especially comprises in at % 67% Ni, 22% Cr, 10% Al, 1.0% Y, especially consists of Amdry 962.

The first inner MCrAlX' layer 7' is preferably applied by HVOF.

A second inner layer 16 is applied on the first inner MCrAlX' layer 7' (c.) in FIG. 5). The layer 16 is especially a MCrX" layer with X"=Si and/or B.

This additional layer 16 has a different composition than the first inner layer 7' and is very especially a NiCrSiB layer (Amdry 103 which consists of in at % 74 Ni, 17 Cr, 9.2 Si, 0.1 B).

The second inner layer 16 is preferably applied by HVOF.

On or in this second inner layer 16 a chromium rich layer 10 is applied on, especially an α-Cr-layer (d.) in FIG. 5, therefore the reference 16 in FIG. 5 *d*) represents the thickness of the inner layer 16 or that a diffusion layer is present and not one composition).

The chromizing is preferably performed from 1000° C. to 1150° C. preferably for 1 to 6 hours, preferably at 1050° C.-1075° C. for 2 h to 4 h.

The chromizing treatment will preferably lead to diffusion layer on the first inner layer 7'.

This layer system 1 is preferably heat treated, so that the overlay α-Cr is diffused into the inner MCrAlX' layer 7'.

On the chromium rich layer 10 an aluminide layer 22 is applied (e.) in FIG. 5).

This is preferably achieved by Ni-plating the chromium rich layer 10 and aluminizing this plated Ni-Layer. The Ni-plate has preferably has a thickness of 10 μm to 20 μm.

Preferably an annealing heat treatment after Ni-plating is performed, preferably at 1121° C. for preferably 2 h.

This annealing treatment is preferably performed in vacuum.

The following aluminizing is performed preferably at 1080° C. for preferably 7 h.

After aluminizing a final annealing heat treatment is performed, preferably at 1080° C. for 2 h.

This annealing treatment is preferably performed in vacuum.

A general remark: The chromizing or aluminizing can lead to diffusion layers as shown in FIGS. 4, 5 or as overlays as shown in FIG. 1, 2 or 3. But this is not limiting. Both features can be present.

Another preferred example is described in the following:

Base coat: MCrAlY sprayed by HVOF or Plasma (could be sprayed by suitable alternative such as VPS or LPPS).

Cr Rich Layer: Applied by CVD or above-the-source Chromizing methods. It was found that a 4 h Chromizing cycle was required to ensure a stable Cr layer during subsequent annealing processes.

Ni: Ni plating 10 μm to 20 μm

Aluminizing: Applied by CVD or above the source Aluminizing methods. Final annealing would be required to reintroduce the mechanical properties of the substrate materials.

Another proposal is to apply a coating system using the following configuration where Si has been introduced in the coating:

Base Coat: MCrAlY sprayed by HVOF or Plasma (could be sprayed by suitable alternative such as VPS or LPPS).

Cr Rich Layer: The MCrAlY was over chromized by CVD or above-the-source methods for 4 hours. This was followed by application of NiCrSiB (Amdry 103 powder or similar chemistry powder) using HVOF or Plasma methods (could be sprayed by suitable alternative such as VPS or LPPS).

Aluminizing: Applied by CVD or above the source Aluminizing methods. Final annealing would be required to reintroduce the mechanical properties of the substrate materials.

Figure 6:
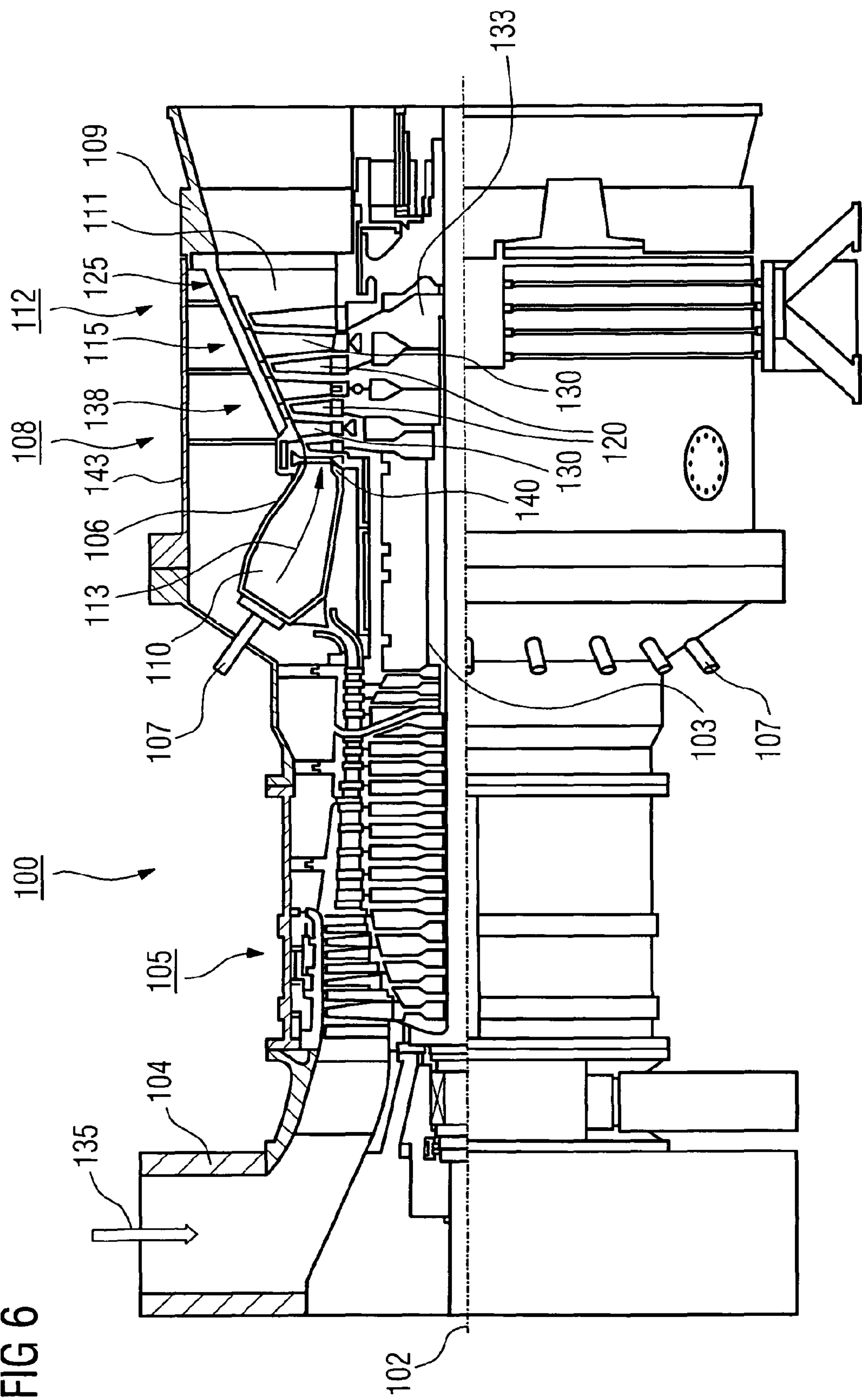
FIG. 6 a gas turbine

FIG. 6 shows, by way of example, a gas turbine 100 in the form of a longitudinal part section. In its interior, the gas turbine 100 has a rotor 103, which is mounted such that it can rotate about an axis of rotation 102 and has a shaft 101, also known as the turbine rotor. An intake housing 104, a compressor 105 *a*, for example toroidal, combustion chamber 110, in particular an annular combustion chamber, with a plurality of coaxially arranged burners 107, a turbine 108 and the exhaust casing 109 follow one another along the rotor 103.

The annular combustion chamber 110 is in communication with a, for example annular, hot-gas duct 111 where, for example, four successive turbine stages 112 foul the turbine 108.

Each turbine stage 112 is formed, for example, from two blade or vane rings. As seen in the direction of flow of a working medium 113, a row 125 formed from rotor blades 120 follows a row 115 of guide vanes in the hot-gas duct 111.

The guide vanes 130 are secured to an inner housing 138 of a stator 143, whereas the rotor blades 120 of a row 125 are fitted to the rotor 103, for example by means of a turbine disk 133. A generator or machine (not shown) is coupled to the rotor 103.

When the gas turbine 100 is operating, the compressor 105 sucks in air 135 through the intake housing 104 and compresses it. The compressed air which is provided at the turbine-side end of the compressor 105 is passed to the burners 107, where it is mixed with a fuel. The mixture is then burnt in the combustion chamber 110 to form the working medium 133. From there, the working medium 133 flows along the hot-gas duct 111 past the guide vanes 130 and the rotor blades 120. The working medium 113 expands at the rotor blades 120, transferring its momentum, so that the rotor blades 120 drive the rotor 103 and the rotor drives the machine coupled to it.

When the gas turbine 100 is operating, the components which are exposed to the hot working medium 113 are subject to thermal loads. The guide vanes 130 and rotor blades 120 of the first turbine stage 112, as seen in the direction of flow of the working medium 113, together with the heat shield elements which line the annular combustion chamber 110, are subject to the highest thermal loads. To withstand the temperatures prevailing there, these components can be cooled by means of a coolant.

It is likewise possible for substrates of the components to have a directional structure, i.e. they are in single-crystal form (SX structure) or include only longitudinally directed grains (DS structure). By way of example, iron-base, nickel-base or cobalt-base superalloys are used as material for the components, in particular for the turbine blades and vanes 120, 130 and components of the combustion chamber 110. Superalloys of this type are known, for example, from EP 1 204 776 B1, EP 1 306 454, EP 1 319 729 A1, WO 99/67435 or WO 00/44949; these documents form part of the present disclosure with regard to the chemical composition of the alloys.

The blades and vanes 120, 130 may likewise have coatings to protect against corrosion (MCrAlX; M is at least one element selected from the group consisting of iron (Fe), cobalt (Co), nickel (Ni), X is an active element and stands for yttrium (Y) and/or silicon and/or at least one of the rare earth elements or hafnium). Alloys of this type are known from EP 0 486 489 B1, EP 0 786 017 B1, EP 0 412 397 B1 or EP 1 306 454 A1, which are intended to form part of the present disclosure with regard to the chemical composition.

A thermal barrier coating consisting, for example, of $ZrO_2$, $Y_2O_4$—$ZrO_2$, i.e. it is not, is partially or is completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here) facing the inner housing 138 of the turbine 108 and a guide vane head on the opposite side from the guide vane root. The guide vane head faces the rotor 103 and is fixed to a securing ring 140 of the stator 143.

Figure 7:
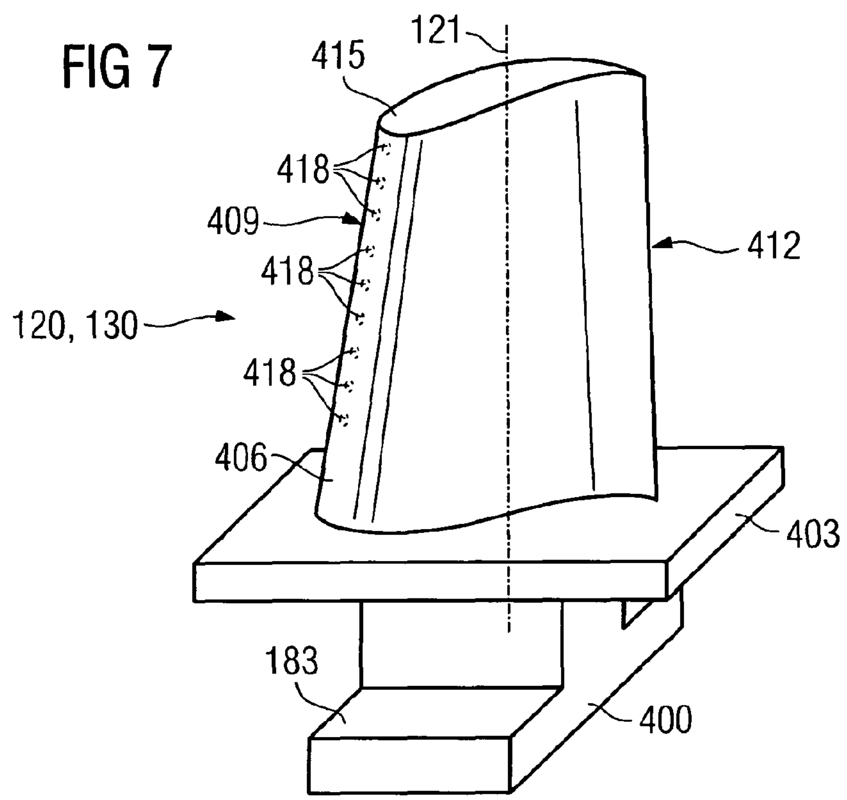
FIG. 7 a blade

FIG. 7 shows a perspective view of a rotor blade 120 or guide vane 130 of a turbo machine, which extends along a longitudinal axis 121.

The turbo machine may be a gas turbine of an aircraft or of a power plant for generating electricity, a steam turbine or a compressor.

The blade or vane 120, 130 has a securing region 400, an adjoining blade or vane platform 403 and a main blade or main part 406 in succession along the longitudinal axis 121. As guide vane 130, the vane 130 may have a further platform (not shown) at its vane tip 415.

A blade or vane root 183, which is used to secure the rotor blades 120, 130 to a shaft or disk (not shown), is formed in the securing region 400. The blade or vane root 183 is designed, for example, in hammerhead form. Other configurations, such as fir-tree or dovetail root, are also possible. The blade or vane 120, 130 has a leading edge 409 and a trailing edge 412 for a medium which flows past the main blade or vane part 406.

In the case of conventional blades or vanes 120, 130, by way of example, solid metallic materials, in particular superalloys, are used in all regions 400, 403, 406 of the blade or vane 120, 130. Superalloys of this type are known, for example, from EP 1 204 776 B1, EP 1 306 454, EP 1 319 729 A1, WO 99/67435 or WO 00/44949; these documents form part of the present disclosure with regard to the chemical composition of the alloy. The blade or vane 120, 130 may in this case be produced by a casting process, also by means of directional solidification, by a forging process, by a milling process or combinations thereof.

Work pieces with a single-crystal structure or structures are used as components for machines which are exposed to high mechanical, thermal and/or chemical loads during operation. Single-crystal work pieces of this type are produced, for example, by directional solidification from the melt. This involves casting processes in which the liquid metallic alloy is solidified to form the single-crystal structure, i.e. the single-crystal work piece, i.e. directionally. In the process, dendritic crystals are formed in the direction of the heat flux and form either a columnar-crystalline grain structure (i.e. with grains which run over the entire length of the work piece and are referred to in this context, in accordance with the standard terminology, as directionally solidified) or a single-crystal structure, i.e. the entire work piece consists of a single crystal. In this process, the transition to globular (polycrystalline) solidification needs to be avoided, since non-directional growth inevitably leads to the formation of transverse and longitudinal grain boundaries, which negate the good properties of the directionally solidified or single-crystal component. Where directionally solidified microstructures are referred to in general, this is to be understood as encompassing both single crystals, which do not have any grain boundaries or at most have small-angle grain boundaries, and columnar crystal structures, which do have grain boundaries running in the longitudinal direction, but do not have any transverse grain boundaries. In the case of these latter crystalline structures, it is also possible to refer to directionally solidified microstructures (directionally solidified structures). Processes of this type are known from U.S. Pat. No. 6,024,792 and EP 0 892 090 A1; these documents form part of the present disclosure.

The blades or vanes 120, 130 may also have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a thermal barrier coating consisting, for example, of $ZrO_2$, $Y_2O_4$—$ZrO_2$, i.e. which is not, is partially or is completely stabilized by yttrium oxide and/or calcium oxide and/or magnesium oxide, to be present on the MCrAlX. Columnar grains are produced in the thermal barrier coating by suitable coating processes, such as for example electron beam physical vapor deposition (EB-PVD).

The term refurbishment means that protective layers may have to be removed from components 120, 130 after they have been used (for example by sandblasting). Then, the corrosion and/or oxidation layers or products are removed. If necessary, cracks in the component 120, 130 are also repaired using the solder according to the invention. This is followed by recoating of the component 120, 130, after which the component 120, 130 can be used again.

The blade or vane 120, 130 may be of solid or hollow design. If the blade or vane 120, 130 is to be cooled, it is hollow and may also include film cooling holes 418 (indicated by dashed lines).

Figure 8:
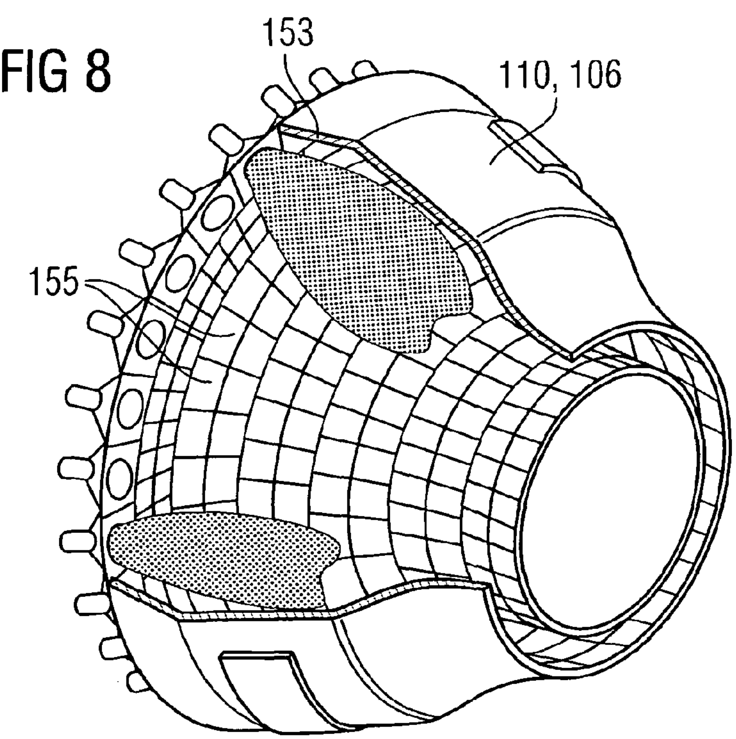
FIG. 8 a combustion chamber.

FIG. 8 shows a combustion chamber 110 of a gas turbine 100 (FIG. 6).

The combustion chamber 110 is configured, for example, as what is known as an annular combustion chamber, in which a multiplicity of burners 107, which are arranged around an axis of rotation 102 in the circumferential direction, open out into a common combustion chamber space 154, with the burners 107 producing flames 156. For this purpose, the combustion chamber 110 overall is of annular configuration, positioned around the axis of rotation 102.

To achieve a relatively high efficiency, the combustion chamber 110 is designed for a relatively high temperature of the working medium M of approximately 1000° C. to 1600° C. To allow a relatively long operating time even with these operating parameters, which are unfavorable for the materials, the combustion chamber wall 153 is provided with an inner lining formed from heat shield elements 155 on its side facing the working medium M. Each heat shield element 155 made from an alloy is equipped on the working medium side with a particularly heat-resistant protective layer (MCrAlX layer and/or ceramic coating) or is made from material that is able to withstand high temperatures (solid ceramic bricks). These protective layers may be similar to the turbine blades or vanes, i.e. meaning for example MCrAlX: M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating to be present on the MCrAlX, consisting, for example, of $ZrO_2$, $Y_2O_4$—$ZrO_2$, i.e. it is not, is partially or is completely stabilized by yttrium oxide and/or calcium oxide and/or magnesium oxide.

Columnar grains are produced in the thermal barrier coating by suitable coating processes, such as for example electron beam physical vapor deposition (EP-PVD).

The term refurbishment means that protective layers may have to be removed from heat shield elements 155 after they have been used (for example by sandblasting). Then, the corrosion and/or oxidation layers or products are removed. If necessary, cracks in the heat shield element 155 are also repaired using the solder according to the invention. This is followed by recoating of the heat shield elements 155, after which the heat shield elements 155 can be used again.

Moreover, on account of the high temperatures in the interior of the combustion chamber 110, it is possible for a cooling system to be provided for the heat shield elements 155 and/or for their holding elements. The heat shield elements 155 are in this case, for example, hollow and may also include film cooling holes (not shown) which open out into the combustion chamber space 154.

The invention claimed is:

1. A layer system, comprising:

a substrate, a first layer comprising two MCrX inner layers on the substrate, wherein said two MCrX inner layers comprise a second inner layer, the second inner layer being an MCrX" layer, wherein X" consists of Si and B, a second layer comprising a chromized layer on the first layer, and a third layer comprising an aluminized MCrX layer on the second layer, wherein X is selected from the group consisting of yttrium (Y), silicon (Si), boron (B), and combinations thereof, and wherein M is an element selected from the group consisting of nickel (Ni), cobalt (Co), and a combination thereof.

2. The layer system according to claim 1, wherein only one of the two inner layers is directly in contact with the substrate.

3. The layer system according to claim 1, wherein said two inner MCrX layers comprises a first inner layer, the first inner layer being an MCrAlX' layer, wherein X' comprises Yttrium (Y).

4. The layer system according to claim 3, wherein the MCrAlX' layer comprises a NiCrAlY alloy.

5. The layer system according to claim 1, wherein the second layer on the first layer comprises an α-chromium layer.

6. The layer system according to claim 1, wherein the chromized layer is disposed on top of the second inner layer.

7. A method for producing a component, comprising:

applying a first layer comprising two MCrX inner layers on a substrate, wherein said two MCrX inner layers comprises a second inner layer, the second inner layer being an MCrX" layer, wherein X" consists of Si and B, applying a second layer comprising a chromized layer on the first layer, applying a third layer comprising an aluminized MCrX layer on the second layer, wherein X is selected from the group consisting of yttrium (Y), silicon (Si), boron (B), and combinations thereof, and wherein M is selected from the group consisting of nickel (Ni), cobalt (Co), and a combination thereof.

8. The method of claim 7, wherein the two MCrX inner layers are applied by HVOF.

9. The method according to claim 7, wherein the second layer comprises an α-chromium layer.

10. The method according to claim 7, further comprising after the applying of the first and second inner layers, performing a stabilizing heat treatment at 1000 to 1025° C. and for 6 h.

11. The method according to claim 7, wherein the second layer is applied by a chromizing treatment at a temperature between 1050° C. and 1080° C. for 2 h to 4 h.

* * * * *